(12) United States Patent
Suzuki

(10) Patent No.: US 8,774,551 B2
(45) Date of Patent: Jul. 8, 2014

(54) IMAGE PROCESSING APPARATUS AND IMAGE PROCESSING METHOD FOR REDUCING NOISE

(75) Inventor: Masaki Suzuki, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 13/565,509

(22) Filed: Aug. 2, 2012

(65) Prior Publication Data

US 2013/0064470 A1 Mar. 14, 2013

(30) Foreign Application Priority Data

Sep. 14, 2011 (JP) ................................ 2011-200493

(51) Int. Cl.
*G06K 9/40* (2006.01)

(52) U.S. Cl.
USPC ........................................................ 382/266

(58) Field of Classification Search
None
See application file for complete search history.

(56) References Cited

U.S. PATENT DOCUMENTS

| | | | | |
|---|---|---|---|---|
| 4,511,219 A * | 4/1985 | Giles et al. | ........................ | 349/17 |
| 7,253,645 B2 * | 8/2007 | Talbot et al. | ............. | 324/754.22 |
| 7,925,076 B2 * | 4/2011 | Abe et al. | ....................... | 382/151 |
| 7,965,905 B2 * | 6/2011 | Allon et al. | .................... | 382/294 |
| 8,498,489 B2 * | 7/2013 | Abe et al. | ....................... | 382/209 |
| 2005/0135700 A1 * | 6/2005 | Anderson | ....................... | 382/261 |
| 2006/0232583 A1 * | 10/2006 | Petrov et al. | .................... | 345/419 |
| 2007/0292037 A1 * | 12/2007 | Allon et al. | .................... | 382/238 |
| 2008/0051648 A1 * | 2/2008 | Suri et al. | ....................... | 600/407 |
| 2008/0063237 A1 * | 3/2008 | Rubenstein | .................... | 382/103 |
| 2008/0069453 A1 * | 3/2008 | Abe et al. | ....................... | 382/209 |
| 2008/0166030 A1 * | 7/2008 | Morris et al. | ................. | 382/128 |
| 2008/0249414 A1 * | 10/2008 | Yang et al. | ..................... | 600/445 |
| 2009/0060373 A1 * | 3/2009 | Perera et al. | ................... | 382/264 |
| 2011/0012830 A1 * | 1/2011 | Yeh | ................ | 345/158 |
| 2011/0063415 A1 * | 3/2011 | Gefen et al. | .................... | 348/43 |
| 2011/0069189 A1 * | 3/2011 | Venkataraman et al. | .. | 348/218.1 |
| 2011/0080487 A1 * | 4/2011 | Venkataraman et al. | .. | 348/218.1 |
| 2011/0110597 A1 * | 5/2011 | Abe et al. | ....................... | 382/199 |
| 2011/0122308 A1 * | 5/2011 | Duparre | ........................ | 348/340 |

FOREIGN PATENT DOCUMENTS

JP 2011-022805 2/2011
JP 2011-113527 6/2011

* cited by examiner

*Primary Examiner* — Bhavesh Mehta
*Assistant Examiner* — Feng Niu
(74) *Attorney, Agent, or Firm* — Fitzpatrick, Cella, Harper & Scinto

(57) ABSTRACT

When a noise of an image is reduced by using a plurality of sheets of images, a noise of a portion which cannot be aligned cannot be reduced. Aligning processing of the plural images is performed to generate an average image formed by pixels subjected to the aligning processing. Further, a difference between average image data representing the average image and input image data representing an input image is calculated, and the noise of the input image is reduced by using the calculated difference.

13 Claims, 16 Drawing Sheets

IMAGE PROCESSING APPARATUS AND IMAGE PROCESSING METHOD FOR REDUCING NOISE

BACKGROUND OF THE INVENTION

1. Field of the Invention

The present invention relates to an image processing apparatus, an image processing method, and a program for providing a function of reducing noise of an image which is obtained from, for example, a camera array type image-capturing unit.

2. Description of the Related Art

In recent years, in an industry field, there is progressed high function formation of a camera which makes use of a concept of light field. Light field is a concept of dividing light which enters a lens from an object to capture an image thereof. There are two ways of main methods which embody the concept. A first one thereof is a method of arranging a lens array between a sensor and a main lens. A second one thereof is a method of a so-to-speak camera array (as known as camera array system, multiple lens camera, and the like) which uses plural sets of main lenses and sensors.

When a camera which makes use of the concept of light field is utilized, there can be realized a function which has not been present in a conventional single lens camera such as distance estimation, dynamic change of blur quality or the like. On the other hand, a performance of a conventional function can also be improved although the function is not new. For example, a performance of a noise reducing function can be improved.

Taking an example of the camera array, when a group of plural images obtained from the same object are aligned, and thereafter an average image of the images is generated, a noise is reduced in principle. For example, Japanese Patent Laid-Open No. 2011-113527 describes an invention in which images are aligned and superposed and a high-quality image is obtained by MAP method. Also, Japanese Patent Laid-Open No. 2011-022805 describes an invention of performing super-resolution processing by aligning.

However, in a system of averaging images by aligning as proposed in Japanese Patent Laid-Open No. 2011-113527 or Japanese Patent Laid-Open No. 2011-022805 described above, there is not provided a function of reducing noise in all of the areas in the image.

Because, occlusion is present in images which are captured from different view points, and there is present an image area which cannot be aligned. Occlusion signifies that there is generated an area an image of which can be captured by a certain image-capturing unit, but cannot be captured by other image-capturing unit. That is, although when an image area in which occlusion is not present, plural images can be aligned and thus noise is reduced, in an area in which the occlusion is present, plural images cannot be aligned and thus noise at a portion where images cannot be aligned cannot be reduced. In this way, there poses a problem that when noise of images which are captured from different view points is attempted to be reduced, a degree of reducing noise is changed depending on the image area.

SUMMARY OF THE INVENTION

An image processing apparatus according to the present invention includes an inputting unit configured to input a plurality of pieces of image data; an aligning unit configured to perform aligning processing of a plurality of images represented by the inputted image data; an average image generating unit configured to generate average image data representing an average image formed by pixels subjected to the aligning processing by the aligning unit; a subtracting unit configured to calculate a difference between the average image represented by the average image data and the image represented by the inputted image data; and a noise reducing unit configured to reduce a noise of the image represented by the inputted image data by using the calculated difference.

According to the present invention, there can be provided an image in which a degree of reducing a noise in the image is uniform.

Further features of the present invention will become apparent from the following description of exemplary embodiments (with reference to the attached drawings).

DESCRIPTION OF THE EMBODIMENTS

First Embodiment

Figure 1:
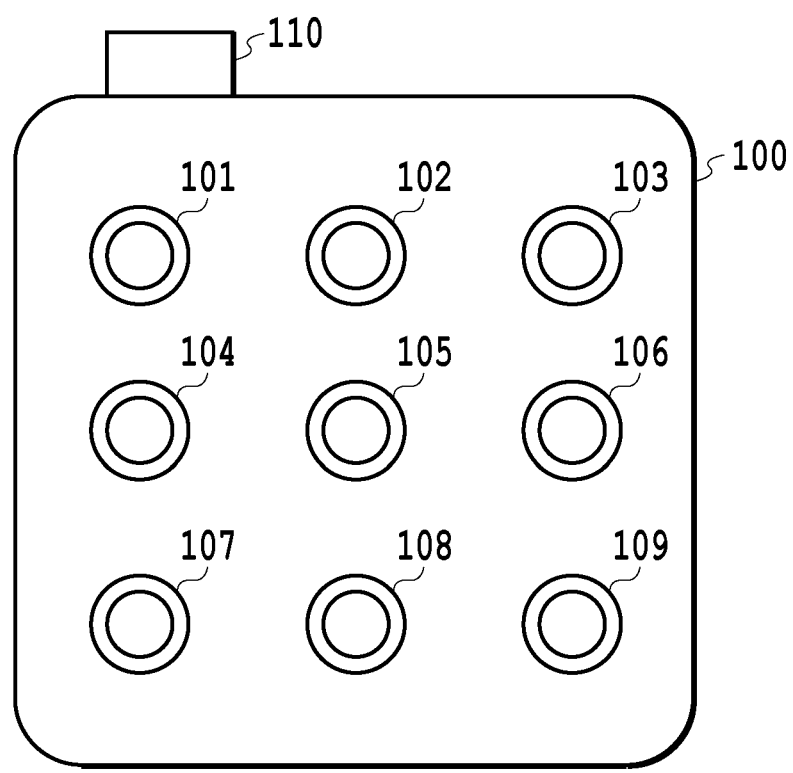
FIG. 1 is a view showing an example of a camera array type image-capturing device including plural image-capturing units according to an embodiment of the present invention.

FIG. 1 is a view showing an example of a camera array type image-capturing device (image processing apparatus) which includes plural image-capturing units. An image-capturing device 100 includes 9 image-capturing units 101 to 109 which acquire color images, and an image-capturing button 110. Nine image-capturing units are arranged uniformly on a square lattice.

When a user presses down the image-capturing button 110, the image-capturing units 101 to 109 receive light information of an object by sensors (image-capturing elements), received signals are subjected to A/D conversion, and image data (digital data) representing plural color images are simultaneously acquired. A group of color images which have captured images of the same object from plural view points can be obtained by such a camera array type image-capturing device.

Incidentally, although according to the example of FIG. 1, a number of the image-capturing units is made to be nine, it is not limited to nine. So far as an image-capturing device includes plural image-capturing units, the present embodiment can be applied thereto. Further, although an explanation has been given of an example of arranging 9 image-capturing units uniformly on the square lattice in an example of FIG. 1, an arrangement of the image-capturing units can be made to be arbitrary. For example, the image-capturing units may be arranged radially or linearly, or may be arranged quite randomly.

Figure 2:
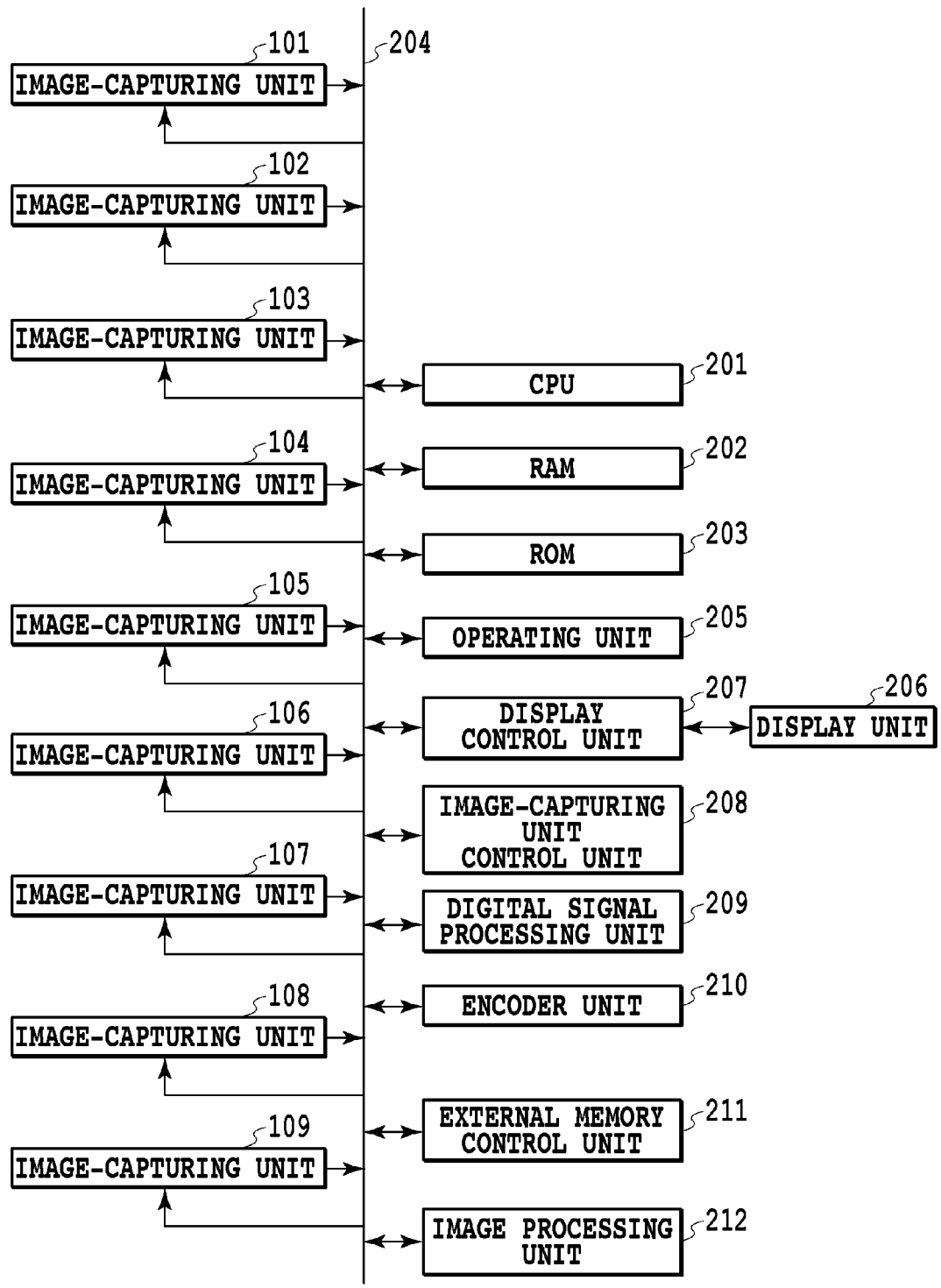
FIG. 2 is a block diagram showing an internal configuration of a camera array type image-capturing device according to an embodiment of the present invention.

FIG. 2 is a block diagram showing an example of an internal configuration of the image-capturing device 100. A central processing unit (CPU) 201 supervisingly controls respective units described below. RAM 202 functions as a main memory and a work area or the like of CPU 201. ROM 203 stores camera parameters (angle of view and camera mode) as well as control programs or the like which are executed by CPU 201. A bus 204 is a route of transferring various kinds of data. For example, digital data which are acquired by the image-capturing units 101 to 109 are transmitted to a prescribed processing unit via the bus 204.

An operating unit 205 is provided with an interface function of receiving an instruction of a user, and includes a button, a mode dial or the like. A display unit 206 displays captured images or characters. As the display unit, for example, a liquid crystal display is used. The display unit 206 may be provided with a touch screen function, and in that case, a user instruction using a touch screen can also be dealt with as an input to the operating unit 205. A display control unit 207 controls display of the captured images or characters which are displayed on the display unit 206.

An image-capturing unit control unit 208 carries out a control of an image-capturing system on the basis of an instruction from CPU 201 such as opening and closing a shutter, adjusting a diaphragm and so on. A digital signal processing unit 209 carries out various kinds of processing such as white balance processing, gamma processing, noise reducing processing, and the like with regard to digital data which are received via the bus 204.

An encoder unit 210 carries out processing of converting digital data into a file format of JPEG, MPEG or the like. An external memory control unit 211 is an interface for connecting to PC or other media (for example, a hard disk, a memory card, a CF card, an SD card, or a USB memory).

An image processing unit 212 generates an image having a small amount of noise from image data representing a group of color images which are acquired by the image-capturing units 101 to 109, or a group of color images which are outputted from the digital signal processing unit 209. Details of the image processing unit 212 will be described later.

Incidentally, although there are present constituent elements of the image-capturing device other than the above-described, the constituent elements are not the main points of the present invention, and therefore, an explanation thereof will be omitted.

Figure 3:
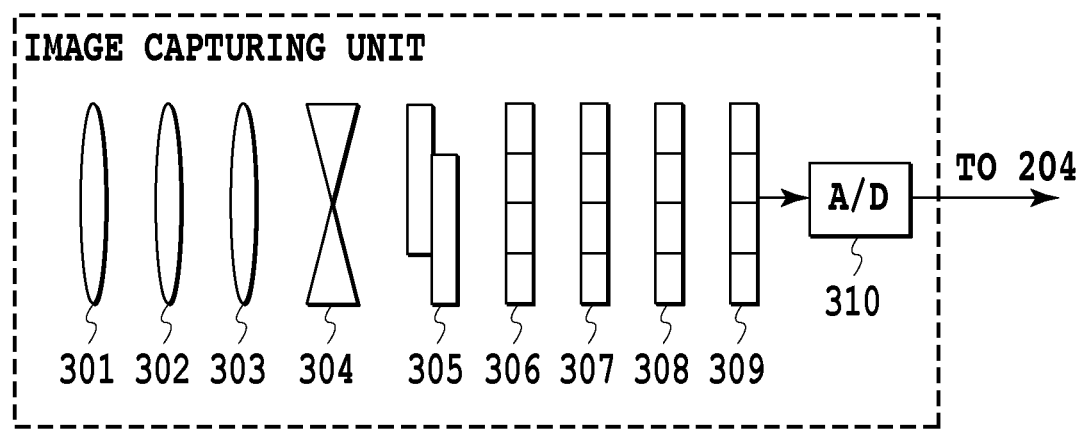
FIG. 3 is a view showing an internal configuration of an image-capturing unit according to an embodiment of the present invention.

FIG. 3 is a view showing an example of an internal configuration of the image-capturing units 101 to 109. The image-capturing units 101 to 109 each is configured by lenses 301 to 303, a diaphragm 304, a shutter 305, an optical low pass filter 306, an iR cut filter 307, a color filter 308, a sensor 309, and an A/D converting unit 310. The lenses 301 to 303 are respectively a zooming lens 301, a focusing lens 302, and a deviation correcting lens 303. The sensor 309 is a sensor of, for example, CMOS, CCD or the like.

When a light amount of an object is detected by the sensor 309, the detected light amount is converted into a digital value by the A/D converting unit 310, becomes digital data, and is outputted to the bus 204.

<Principle of Noise Reducing Processing>

Figure 4:
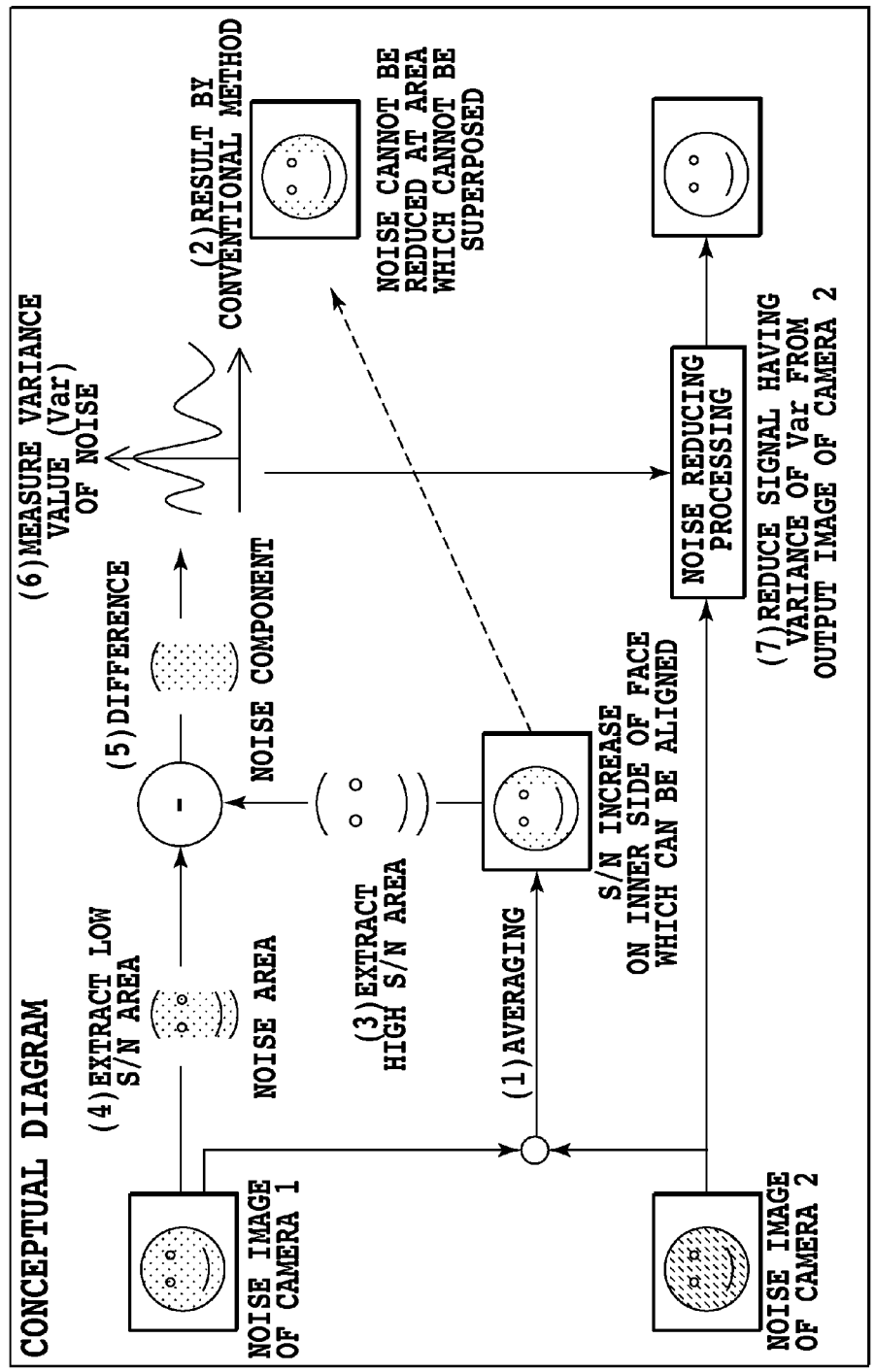
FIG. 4 is a view showing a principle of the present invention according to a first embodiment.

With reference to FIG. 4, an explanation will be given of a principle of an image processing apparatus for reducing noise which is used for a camera array type camera system. In FIG. 4, a double lenses camera is taken as an example in order to simplify the explanation. Further, in an example of FIG. 4, the face of a person is assumed as an object. According to a conventional method, a result of aligning a noise image represented by image data obtained by camera 1 and a noise image represented by an image data obtained by camera 2, and simply superposing and averaging (1) the noise images becomes a noise-reduced image (2). As shown in (2) of FIG. 4, at an inner side area of the face in which the noise images can be superposed, noise can be reduced, and at an outer side area of the face in which the noise images cannot be superposed, noise remains. In this way, areas having different degrees of reducing noise are mixedly present, and therefore, the quality of the image is degraded.

On the other hand, according to the present embodiment, a difference between a high SN area and a low SN area, that is, a noise component is extracted, and only a signal having the noise characteristic is reduced from data over a total of an image. Therefore, there is resolved a conventional problem in which degrees of reducing noise differ at respective areas. Incidentally, notation SN signifies Signal/Noise, signifying that the higher the SN, the higher the quality of the signal. According to the present embodiment, processing of carrying out up to averaging of (1) is the same as those of the conventional method. Next, an area in which the aligning can be carried out, that is, the high SN area is extracted (3). Thereafter, there is extracted the low SN area which is spatially corresponding to the high SN area of the noise image of camera 1 (4). A difference between the high SN area and low SN area becomes a noise amount which is reduced by averaging the noise image data that represents the noise image of camera 1 and the noise image data of camera 2 (5). A noise reducing processing is carried out for the noise image data of camera 2 with the noise amount as an index. That is, as the noise amount, a variance value of noise is measured (6), and the noise image data of camera 2 is subjected to Wiener filter processing which makes use of the variance value of the noise. The Wiener filter is a filter which is defined such that root mean squares of an original image and an image as filtered are minimized. As a result thereof, there is not a large variation in a noise reducing amount of a total of the image.

As described above, the noise reducing processing explained is performed by the image processing unit 212. Hence, an explanation will be given of the image processing unit 212 as follows.

<Configuration View of Image Processing Unit 212>

Figure 5:
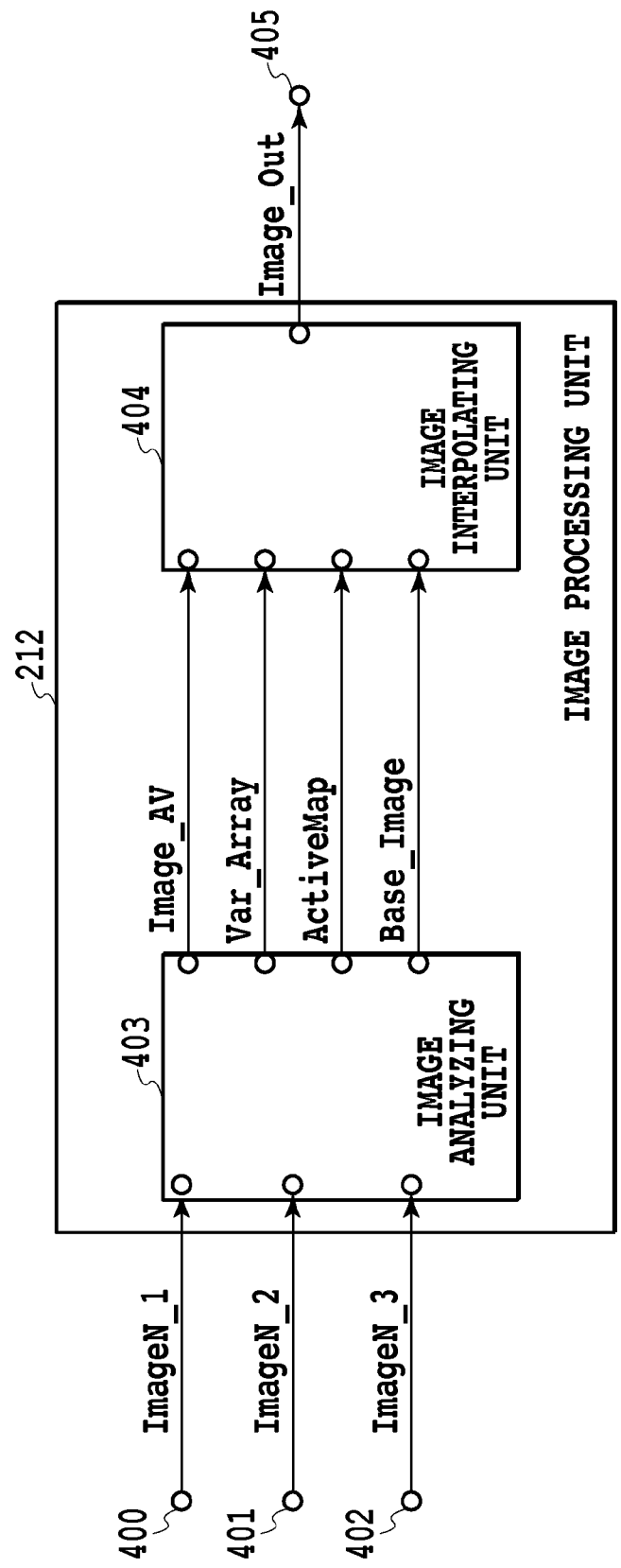
FIG. 5 is a diagram showing a configuration of an image processing unit 212 according to the first embodiment.

FIG. 5 is a diagram showing an example of a configuration of the image processing unit 212 according to the present embodiment. Incidentally, although according to the present embodiment, input image data representing an input image are made to be 3 sheets of data, any number of sheets will do so far as a number of sheets is plural.

As shown in FIG. 5, the image processing unit 212 includes terminals 400 to 402 which are inputting units, a terminal 405, an image analyzing unit 403, and an image interpolating unit 404. The terminals 400 to 402 are terminals of inputting input image data ImageN_1, ImageN_2, and ImageN_3, respectively.

The image analyzing unit 403 analyzes the input image data ImageN_1, ImageN_2, and ImageN_3. Further, the image analyzing unit 403 generates average image data Image_AV representing an average image of images after the aligning, noise variance map Var_Array for respective brightnesses, a superposed-sheet number map ActiveMap, and a base image data Base_Image representing a base image. Details thereof will be described later.

The image interpolating unit 404 carries out interpolating processing from the average image data Image_AV of images after the aligning, the noise variance map Var_Array for respective brightnesses, the superposed-sheet number map ActiveMap, and the base image data Base_Image. Further, the image interpolating unit 404 generates an image Image_Out after reducing noise. The terminal 405 outputs the image Image_Out after reducing noise.

<Flow of Processing of Image Processing Unit 212>

Figure 6:
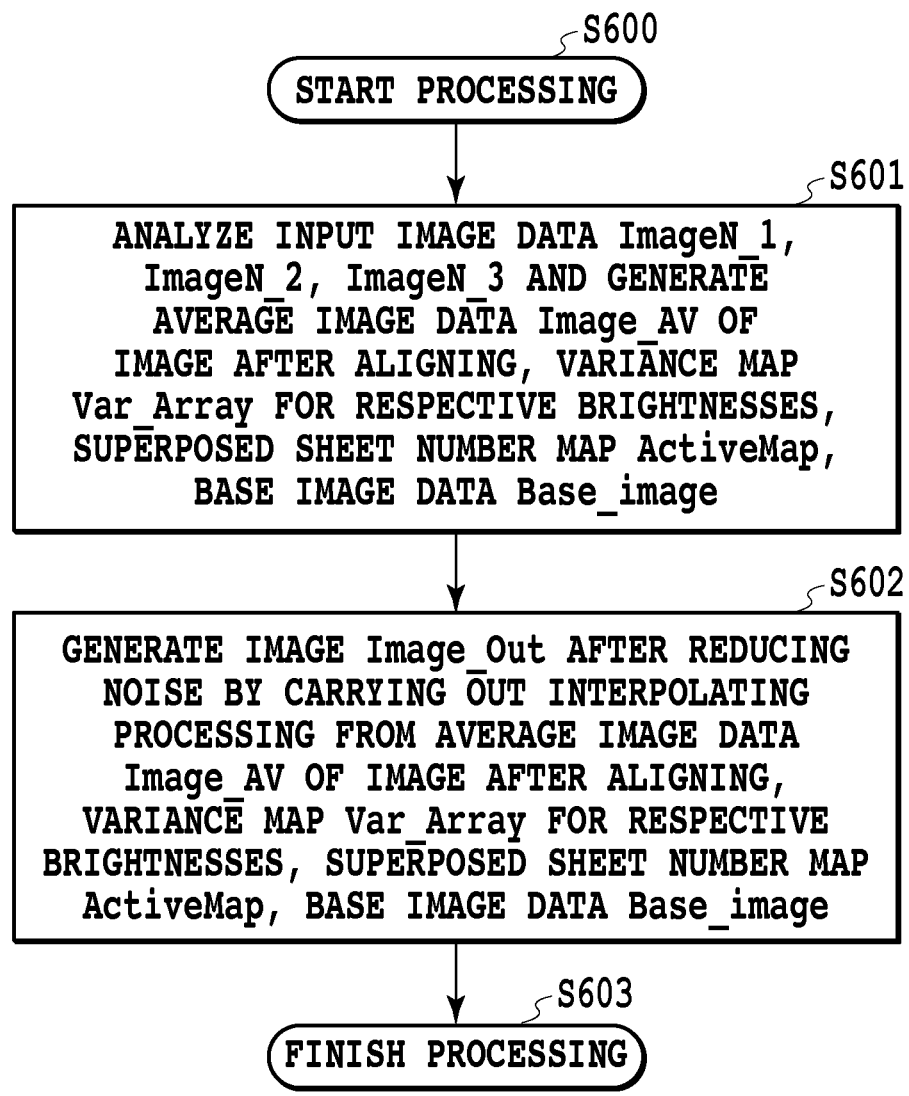
FIG. 6 is a diagram showing a flowchart of the image processing unit 212 according to the first embodiment.

An explanation will be given of a flow of processing of the image processing unit 212 in reference to FIG. 6 as follows. When processing is started (step 600), at step 601, the input image data ImageN_1, ImageN_2, and ImageN_3 are analyzed, and four pieces of information which are necessary for reducing noise shown below are generated.

A first piece of information which is generated at step 601 is base image data Base_Image representing a base image. Base_Image is selected as one of the input image data ImageN_1, ImageN_2, and ImageN_3. A specific selecting method will be described later.

A second piece of information is average image data Image_AV of an image after the aligning. Image_AV is data representing an image which is configured by an average value of three pixels spatially corresponding to each other in three images after aligning input images which are represented by three pieces of input image data. Naturally, there is also generated a pixel which has failed in aligning. However, in a case in which a pixel cannot be aligned, an average value is calculated by using only pixels which can be aligned. For example, when aligning has failed at a first sheet of a reference image, and aligning has succeeded at a second sheet of a reference image, there is calculated an average value of a processing target pixel of a base image data, and a processing target pixel of a second sheet of reference image data.

Figure 7:
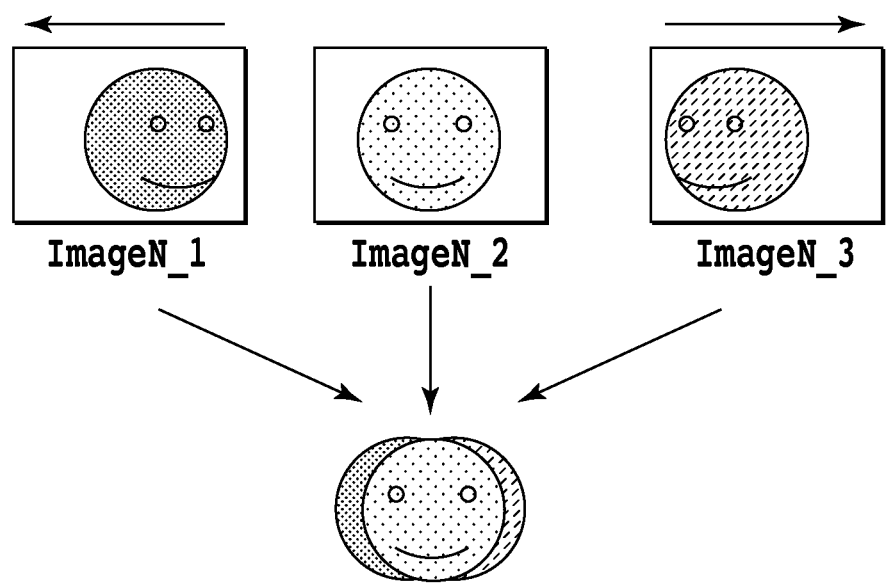
FIG. 7 is a view showing a concept of aligning of images according to the first embodiment.

A conceptual example will be explained with reference to FIG. 7. Three images shown in FIG. 7 represent images which are obtained by capturing images of the same object by a camera array. The face which is the object is arranged at left (ImageN_1), center (ImageN_2), right (ImageN_3) of the images by a parallax among cameras. In a case in which the three images are aligned, when a base image represented by base image data is made to be ImageN_2, the faces of ImageN_1 and ImageN_2 are superposed when ImageN_1 is shifted to the left. Also, when ImageN_3 is shifted to the right, the face of ImageN_2 and the face of ImageN_3 are superposed. When the faces can be superposed, next, there is calculated an average value of image data of portions which are superposed with the face of the base image ImageN_2. In this example, the average value is calculated by dividing the face to three areas.

Figure 8:
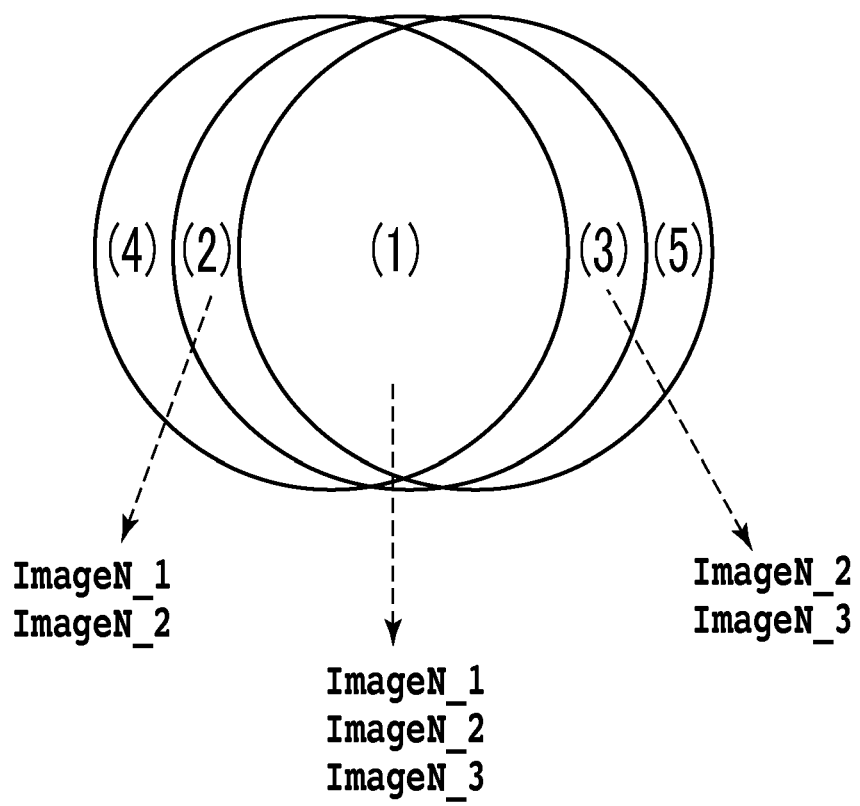
FIG. 8 is a view showing a concept of a method of generating image data after aligning according to the first embodiment.

FIG. 8 is conceptual view drawing a contour of the face after aligning in order to visualize a degree of superposing. At (1) of FIG. 8, all of ImageN_1, ImageN_2, and ImageN_3 are superposed. At (2) of FIG. 8, ImageN_1 and ImageN_2 are superposed. At (3) of FIG. 8, ImageN_2 and ImageN_3 are superposed. Therefore, there are respectively calculated an average value of ImageN_1, ImageN_2, and ImageN_3 at area (1), an average value of ImageN_1 and ImageN_2 at area (2), and an average value of ImageN_2 and ImageN_3 at area (3). As a result thereof the average image data Image_AV is generated. Incidentally, with regard to areas of (4) and (5) in which the images cannot be superposed, the areas are not used for generating the average image data ImageN_AV. A further detailed explanation thereof will be described later.

A third piece of information which is generated at step 601 is a superposed-sheet number map ActiveMap. The superposed-sheet number map ActiveMap indicates by what number of sheets of images of image data are utilized for averaging respective pixels of the average image data Image_AV. In the example at this time, the superposed-sheet number map ActiveMap is three at center area of the face, and two at left and right areas of the face. A further detailed explanation will be described later.

A fourth piece of information which is generated at step 601 is produced by variance map Var_Array for respective brightnesses. The variance map Var_Array for respective brightnesses shows variances for respective brightnesses of a noise signal of Base_Image which is presumed from an area at which a superposed-sheet number map ActiveMap of the average image data Image_AV has a maximum value, and a pixel value of the base image data Base_Image spatially corresponding to the area. At the area where ActiveMap has the maximum value, the maximum value is three in the example at this time. A further detailed explanation thereof will be described later.

At step 601, as described above, there are generated the average image data Image_AV of the image after aligning, the noise variance map Var_Array for respective brightnesses, the superposed-sheet number map ActiveMap, and the base image data Base_Image.

At step 602, there are utilized the average image data Image_AV of the image after aligning, the noise variance map Var_Array for respective brightnesses, the superposed-sheet number map ActiveMap, and the base image data Base_Image which are generated at step 601. That is, an image Image_Out after reducing noise is generated from these data, and processing is finished (step 603).

<Configuration of Image Analyzing Unit>

Figure 9:
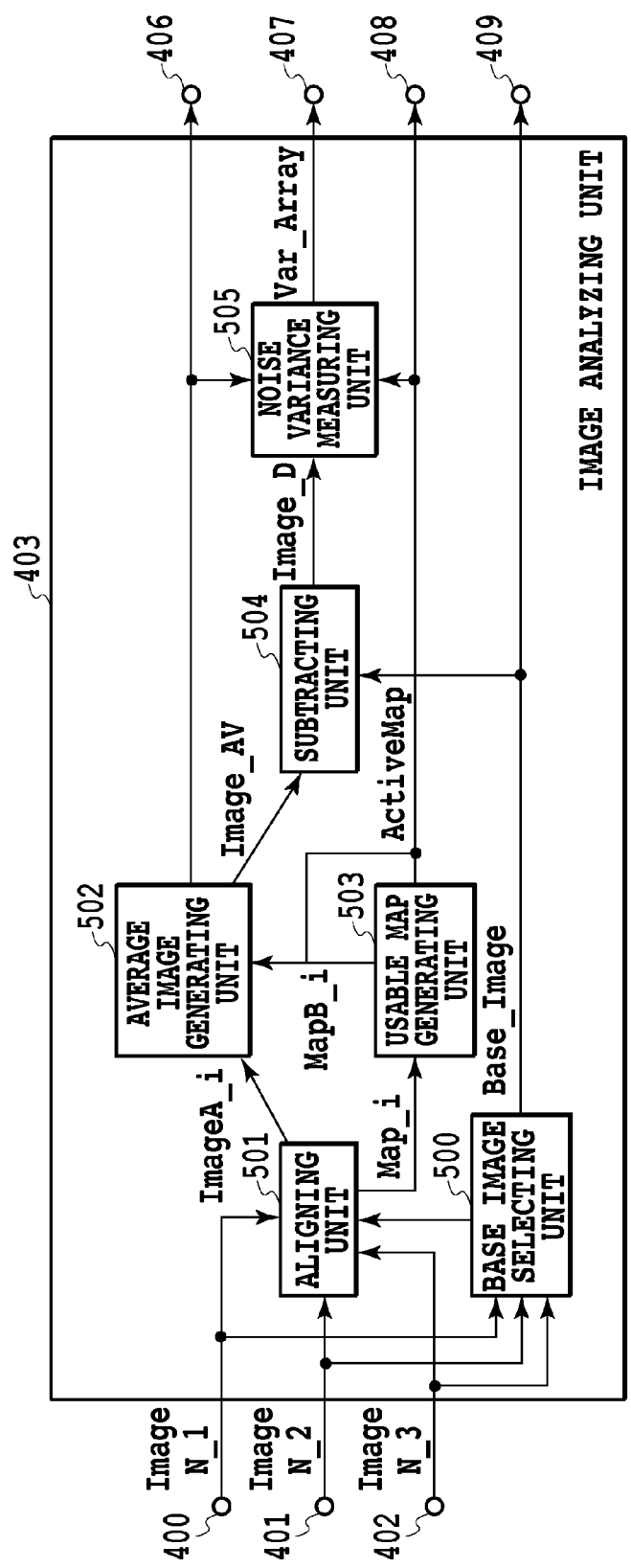
FIG. 9 is a diagram showing a configuration of an image analyzing unit 403 according to the first embodiment.

Next, an explanation will be given of details of the image analyzing unit 403 with reference to FIG. 9. The image analyzing unit 403 includes, for example, a base image selecting unit 500, an aligning unit 501, an average image generating unit 502, a usable map generating unit 503, a subtracting unit 504, and a noise variance measuring unit 505.

The base image selecting unit 500 selects the base image data Base_Image representing the base image in aligning from the input image data ImageN_1, ImageN_2, and ImageN_3. A method of selecting the base image data Base_Image will be described later. Incidentally, in the following example, an explanation will be given by assuming that the input image represented by ImageN_2 is selected as the base image.

The aligning unit 501 carries out aligning processing of the base image data Base_Image and image data of the input image data ImageN_1, ImageN_2, and ImageN_3 other than an image corresponding to the base image. Further, the aligning unit 501 outputs the image data ImageA_1, ImageA_2, and ImageA_3 after aligning, and aligning accuracy index value maps Map_1, Map_3 which are calculated in aligning. Incidentally, here, the input image represented by IamgeN_2 corresponds to the base image, and therefore, ImageA_2 becomes image data similar to Base_Image. An aligning accuracy index value map Map_2 in correspondence with the input image represented by ImageN_2 is not outputted. An explanation of the aligning accuracy index value map will be described later.

The average image generating unit 502 outputs the average image data Image_AV in which only pixels which can be aligned are averaged on the basis of the superposed-sheet number map Active_Map and the image data ImageA_i after aligning described later. Incidentally, notation "i" designates a variable which is inputted with a number in correspondence with arbitrary input image data, and in this example, a number of any of 1 to 3.

The usable map generating unit 503 subjects Map_1, Map_3 to threshold processing, and generates MapB_1, MapB_3 by making a pixel which can be aligned to align as "1", and a pixel which cannot be aligned to align as "0". Incidentally, according to the example of the present embodiment, MapB_2 corresponds to the base image, and therefore, all of values thereof become "1". Furthermore, the usable map generating unit 503 generates the superposed-sheet number map Active_Map by storing a sum up value of pixel values spatially corresponding to each other between MapB_i'.

The subtracting unit 504 generates difference image data Image_D representing a difference image of the average image data Image_AV and the base image data Base_Image. Notation Image_D designates a presumed noise amount.

The noise variance measuring unit 505 generates noise variance map Var_Array for respective brightnesses which stores variances of noises in correspondence with brightnesses from the difference image data Image_D, the average image data Image_AV, and the superposed-sheet number map ActiveMap.

Incidentally, according to the example described above, an explanation has been given by taking an example in which the image data ImageA_2 after aligning corresponding to the base image is outputted, and the aligning accuracy index value map Map_2 is not outputted. However, there may be adopted processing in which the image data ImageA_2 after aligning corresponding to the base image is not outputted. Also, there may be adopted processing in which the accuracy index value map Map_2 corresponding to the base image is outputted.

<Flow of Processing of Image Analyzing Unit>

Figure 10:
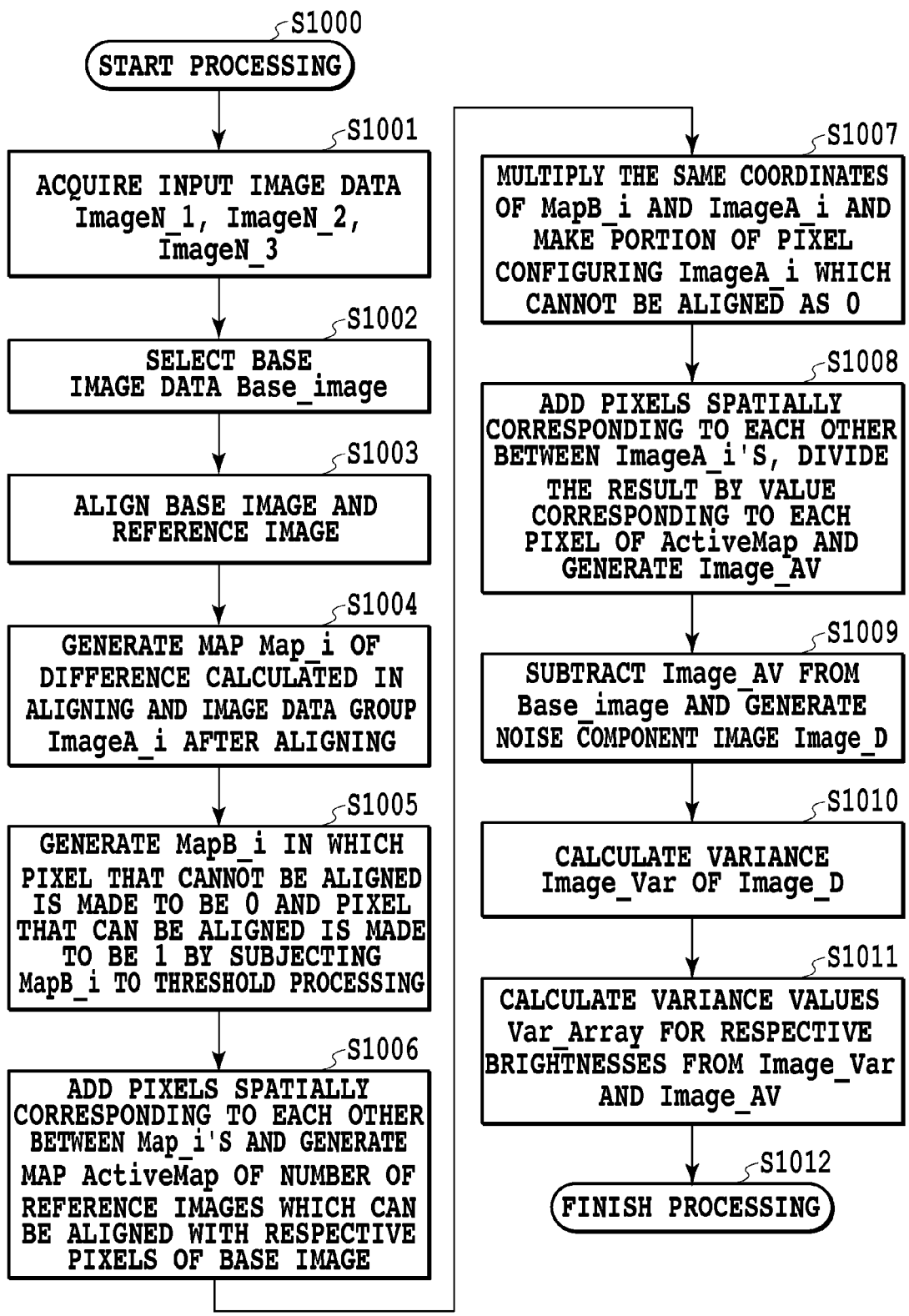
FIG. 10 is a diagram showing a flowchart of the image analyzing unit 403 according to the first embodiment.

An explanation will be given of a flow of processing of the image analyzing unit 403 with reference to FIG. 10 as follows. When processing is started (S1000), the aligning unit 501 acquires the input image data ImageN_1, ImageN_2, and ImageN_3 (S1001). Next, the base image selecting unit 500 selects the base image data Base_Image from the input image data ImageN_1, ImageN_2, and ImageN_3 (S1002). According to the present embodiment, an image which is represented by ImageN_2 is made to be the base image. A specific selecting method of the base image selecting unit 500 will be described later. Thereafter, the aligning unit 501 carries out aligning between the base image represented by the base image data Base_Image, and remaining input image data, that is, input images represented by ImageN_1 and ImageN_3 (S1003). Here, the input image data ImageN_1 and ImageN_3 become reference image data respectively representing reference images in the aligning processing. The aligning unit 501 stores correlation values which are calculated between a target pixel in the base image and target pixels of the reference images which are calculated in aligning respectively as correlation maps Map_1, Map_3. According to the present embodiment, the correlation is calculated by using block matching described later, and therefore, a maximum correlation value is "0", and the lower the correlation, the larger the value. Also, the aligning unit stores a pixel value of a reference image which produces the maximum correlation value as ImageA_i (S1004). Details of aligning will be described later.

Next, the usable map generating unit 503 utilizes a previously set threshold Th, sets values of Map_1, Map_3 which are equal to or smaller than Th as "1", and sets the values of Map_1, Map_3 which are equal to or larger than Th as "0", and respectively stores the values to MapB_1, MapB_3. Also, the usable map generating unit 503 generates data MapB_2 in which all of elements of an image buffer of a size the same as that of MapB_1 are initialized to "1". Further, the usable map generating unit 503 adds values spatially corresponding to each other among MapB_1 and MapB_2 and MapB_3. Furthermore, the usable map generating unit 503 generates the superposed-sheet number map ActiveMap by mapping a number of images in which respective pixels of the base image represented by the base image data Base_Image can be aligned (S1006).

Next, the average image generating unit 502 multiplies pixels corresponding to the same coordinates of MapB_i and ImageA_i by each other, and makes portions of pixels configuring ImageA_i which cannot be aligned as "0" (S1007). Further, the average image generating unit 502 adds pixels spatially corresponding to each other between ImageA_i', divides the result by values corresponding to respective pixels of ActiveMap, and generates the average image data Image_AV of the image after the aligning (S1008). Next, the subtracting unit 504 subtracts the average image data Image_AV from the base image data Base_Image, and generates a difference image (noise component image) data Image_D (S1009).

Next, the noise variance measuring unit 505 calculates a variance Image_Var of the noise component image data Image_D (S1010). Further, the noise variance measuring unit 505 utilizes the average image data Image_AV and the variance Image_Var, and calculates the variance values Var_Array of a noise corresponding to a brightness (0 to 255 according to the present embodiment) (S1011), and processing is finished (S1012).

<Processing of Base Image Selecting Unit 500>

Figure 11:
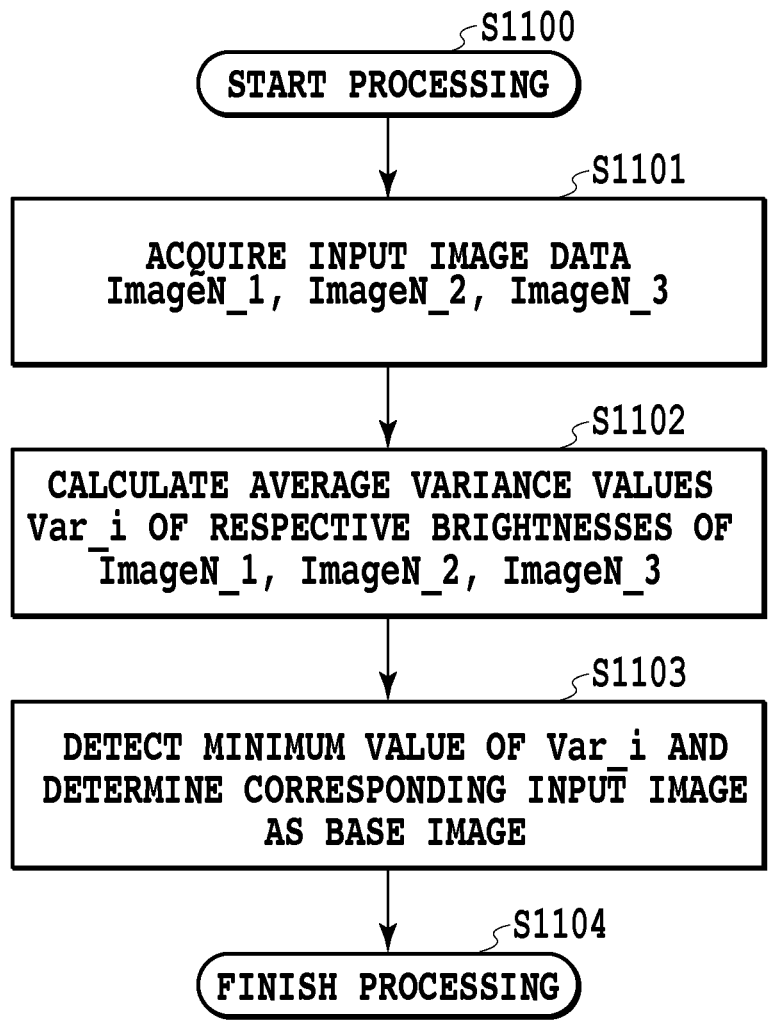
FIG. 11 is a diagram showing a flowchart of a base image selecting unit 500 according to the first embodiment.

An explanation will be given of an example of processing of the base image selecting unit 500 by using a flowchart of FIG. 11. When processing is started, the base image selecting unit 500 acquires the input image data ImageN_1, ImageN_2, and ImageN_3 (step 1101). Next, the base image selecting unit 500 calculates the variance values Var_i, i=1, 2, 3 of brightnesses corresponding to respective images of the input image data ImageN_1, ImageN_2, and ImageN_3 (step 1102). Finally, the base image selecting unit 500 detects a minimum value of Var_i, determines a corresponding input image as the base image, and finishes the processing (step 1104). Incidentally, a method of selecting the base image explained in reference to FIG. 11 shows only an example, and the base image can also be selected by other method. For example, a reference may be made by an image having a structure view which is intended to be outputted finally.

<Processing of Aligning Unit 501>

Figure 12:
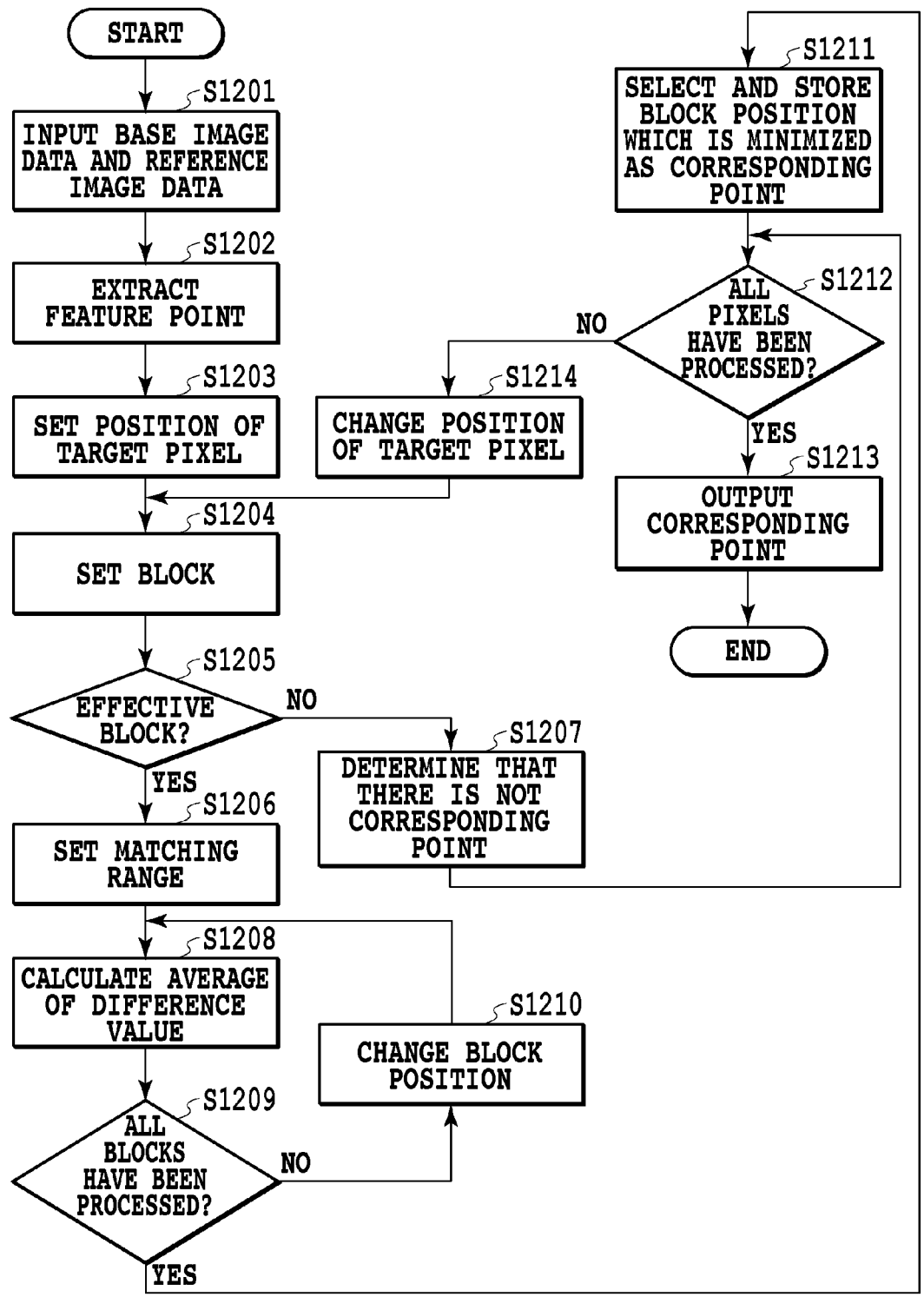
FIG. 12 is a diagram showing a flowchart of an aligning unit 501 according to the first embodiment.

An explanation will be given of a flow of processing of the aligning unit 501 as follows. FIG. 12 is a flowchart showing an example of a flow of aligning processing at step 1003 of the flowchart of FIG. 10.

At step 1201, the aligning unit 501 inputs the base image data Base_Image representing a base image and reference image data representing a reference image. The base image is an image which is determined by the base image selecting unit 500 described above. The reference image is an image other than the base image in input images represented by ImageN_1, ImageN_2, and ImageN_3. For example, in a case in which an image represented by ImageN_1 is a base image, images represented by ImageN_2, ImageN_3 are reference images. According to the present embodiment, the image represented by ImageN_2 is made to be the base image, and the images represented by ImageN_1, ImageN_3 are made to be the reference images. At step 1202, the aligning unit 501 extracts a feature point with regard to the base image represented by the inputted base image data. As a method of extracting a feature point, edge detecting filter processing which is generally used can be used. According to the present embodiment, Sobel filter is used as the edge detecting filter. Further, in extracting a feature point, other edge detecting filter may be used. For example, an edge detecting filter of Robinson may be used. Furthermore, the feature point may be extracted by a method of combining these edge detecting filters.

At step 1203, the aligning unit 501 sets a coordinate position (x, y) of a target pixel for searching a corresponding point from the base image. At step 1204, the aligning unit 501 sets a prescribed block (block of calculating a difference value) centering on the set target pixel in the base image. Further, the aligning unit 501 sets a prescribed block of the reference image and a center position (cx, cy) of the block in the reference image.

At step 1205, the aligning unit 501 determines whether a block at the center position (x, y) which is set at the base image is a block which is effective in correspondence search of a feature point. As a method of determining the effective block, the aligning unit 501 counts a number of feature points which is carried out at step 1202, and determines the effective block in a case in which the number is larger than a previously prescribed number. That is, at step 1205, a block having a number of feature points in the block is determined as the effective block by the aligning unit 500. In a case in which the block is determined as the effective block, the operation proceeds to step 1206. On the other hand, at step 1205, in a case in which the aligning unit 501 determines that the target block is not the effective block, the operation proceeds to step 1207.

At step 1206, the aligning unit 501 sets a range of performing correspondence search of a feature point. Although the range of performing correspondence search of the feature point may be set to an arbitrary size in consideration of operation cost, it is a condition thereof to include the coordinate position (x, y) of the target pixel within the range. Generally, in a case in which a deviation amount is large, it is preferable to set the range of performing correspondence search of the feature point to be large, and in a case in which the deviation amount is small, it is sufficient even when the range of performing correspondence search of the feature point is small.

Figure 13:
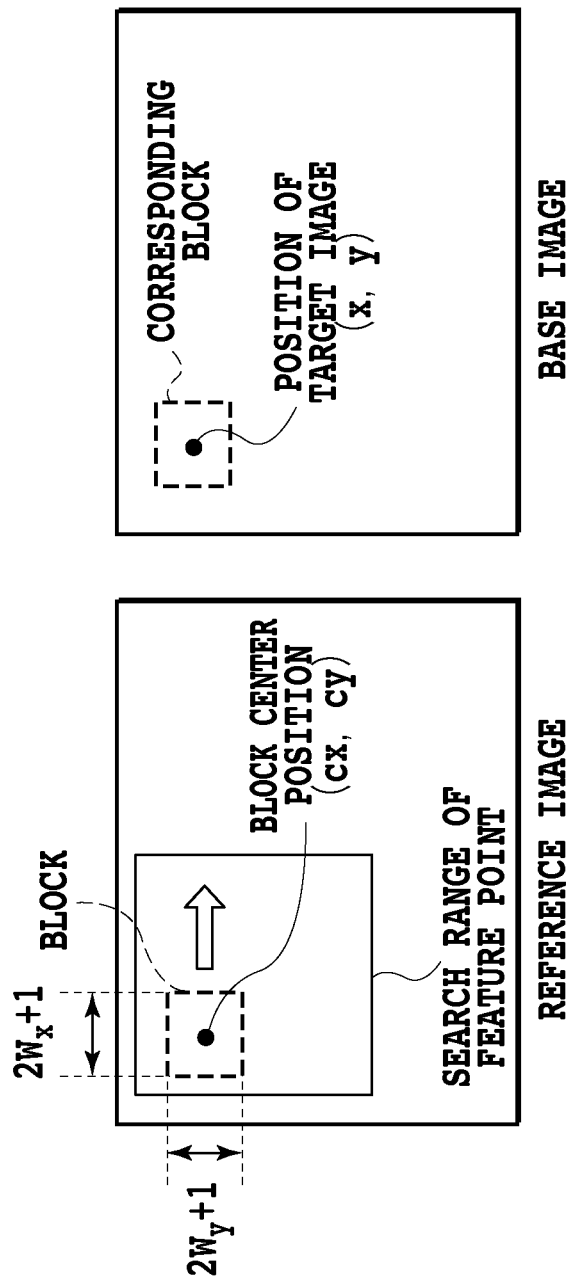
FIG. 13 is a view showing a range of performing correspondence search of a feature point in aligning according to the first embodiment.

FIG. 13 is a view showing the coordinate position (x, y) of the target pixel, a block which is set to the reference image, a center position of the block, and the range of performing correspondence search of the set feature point. In this case, the block has a size which is defined by 2wx+1 pixels in a horizontal direction, and 2wy+1 pixels in a vertical direction, and notations wx and wy are respectively integer values equal to or larger than 0.

The explanation returns to the explanation of the flowchart of FIG. 12. At step 1207, the aligning unit 501 determines that there is not a point corresponding to the coordinate position (x, y) of the target pixel of the base image in the reference image.

At step 1208, the aligning unit 501 calculates an average value of a difference value by using the base image data representing the base image in the set range of the block and the reference image data representing the reference image. Equation (1) is a calculating equation for calculating the average value of the difference value $E_{ave}$ (cx, cy, m) at the center position (cx, cy) of the block.

[Equation 1]

$$E_{ave}(cx, cy, m) = \frac{1}{(2w_x + 1)(2w_y + 1)} \sum_{a=-wx}^{wx} \sum_{b=-wy}^{wy} |i(x + cx + a, y + cy + b, m) - i(x, y, 0)| \quad (1)$$

Here, notation I (x, y, 0) represents the base image, and notation I (x, y, m) represents the reference image. Notation m designates a variable showing a number of the reference image.

At step 1209, the aligning unit determines whether the processing of calculating the average value of the difference value has been finished with regard to all of blocks within the range of correspondence search of the set feature point. When the processing of calculating the average value of the difference value has been finished with regard to all of the blocks, the operation proceeds to step 1211. On the other hand, in a case in which there is an unprocessed block, the operation proceeds to step 1210. At step 1210, the aligning unit 501 changes a block position to a block position in which the average value of the difference value is not calculated yet by updating a center position (cx, cy) of the block. When the block position is changed, the operation returns to step 1208.

At step 1211, the aligning unit 501 calculates a center position (x', y') of the block at which the average value of the difference value is minimized and selects a position of the block at which the average value of the difference value is minimized as a corresponding point within the range of correspondence search of the set feature point. That is, a pixel position of the reference image m corresponding to the image position (x, y) of the base image is selected as (x', y'). A pixel value corresponding to the pixel (x', y') of the reference image m is stored to ImageA_m, and the minimum of the average value of the difference value is stored to Map_m. ImageA_m and Map_m are provided with information of respective pixels, and therefore, become data of an amount of a total pixel number of the image. Notation m designates a variable showing a number of a reference image.

At step 1212, the aligning unit 501 determines whether the processing of calculating the average value of the difference value has been finished with regard to all of the pixels in the base image. When the processing of calculating the average value of the difference value has been finished with regard to all of the pixels, the operation proceeds to step 1213. On the other hand, in a case in which there is an unprocessed pixel, the operation proceeds to step 1214.

At step 1214, the aligning unit 501 updates the position (x, y) of the target pixel, and changes the position of the target pixel to a pixel position at which the average value of the difference value is not calculated yet. When the position of the target pixel is changed, the operation returns to step 1204.

At step 1213, the aligning unit 501 outputs corresponding points of the base image and the reference image which are obtained as described above. Thereafter, Base_Image can finally be outputted as ImageA_0. Thereafter, the processing is finished.

Further, although according to the processing of correspondence search of the feature point in the present embodiment, as shown in Equation (1), the corresponding points between the images are searched on the basis of the average value of the difference value of the base image data and the reference image data, other value may be used. For example, a value which can know a similarity between images at a vicinity of the target pixel of a correlation coefficient or the like may be used in searching the corresponding point.

<Processing of Noise Variance Measuring Unit>

Figure 14:
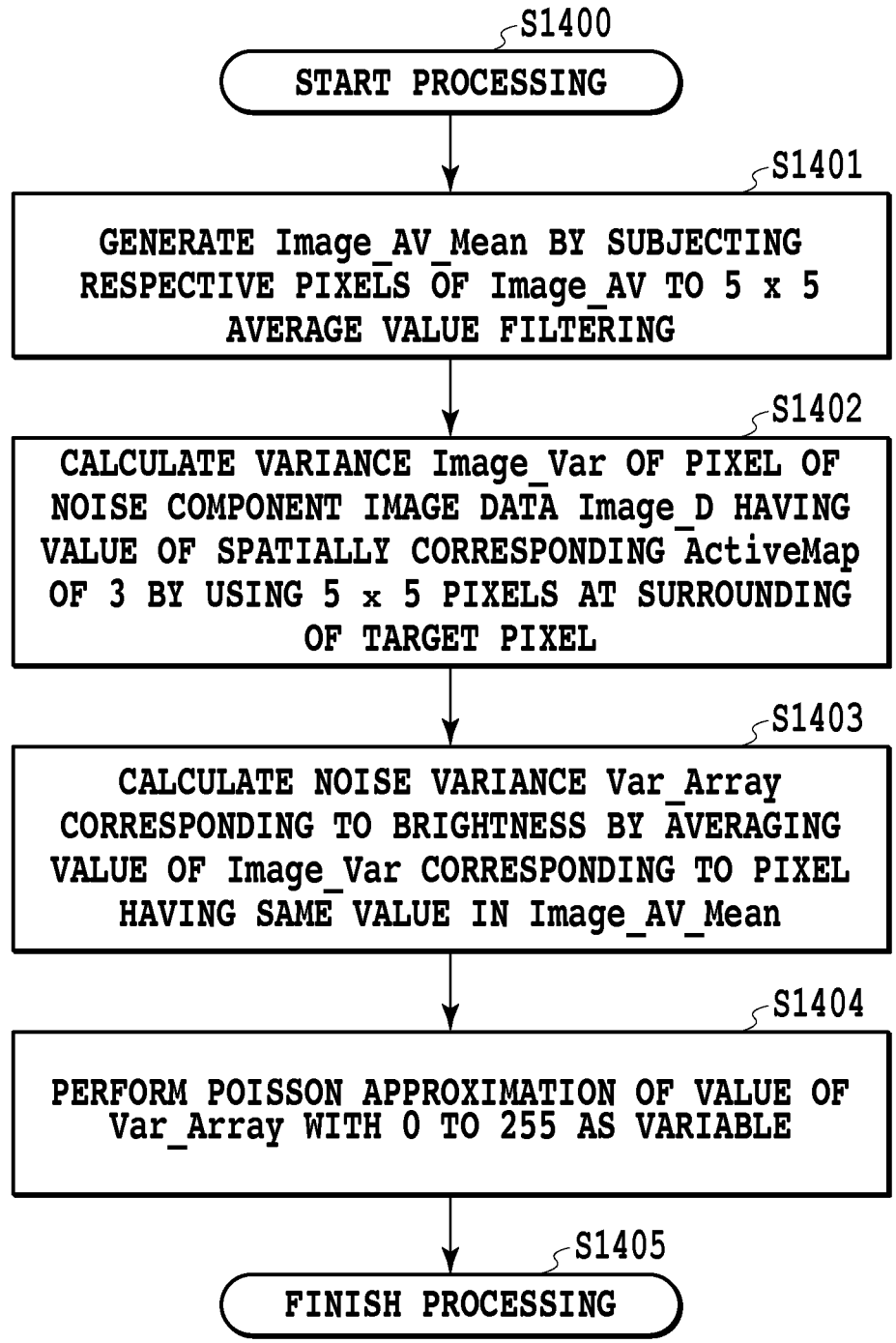
FIG. 14 is a diagram showing a flowchart of a noise variance measuring unit 505 according to the first embodiment.

Next, an explanation will be given of processing of the noise variance measuring unit 505 by using FIG. 14. When the processing is started (step 1400), the noise variance measuring unit 505 generates image data Image_AV_Mean representing a filtered average image by subjecting respective pixels of an average image represented by Image_AV to 5×5 average value filtering (step 1401). Next, the noise variance measuring unit 505 aims at a pixel of pixels of a noise component image data Image_D in which a value of a spatially corresponding superposed-sheet number map ActiveMap is a maximum value of three. Further, a variance Image_Var is calculated by using 5×5 pixels at a surrounding of the aimed pixel (target pixel) (S1402). Finally, the noise variance measuring unit 505 averages values of Image_Var corresponding to pixels having the same value in the filtered average image data Image_AV_Mean, and calculates a noise variance Var_Array corresponding to a brightness (step 1403). Next, it is known that noise can be approximated by Poisson distribution. Therefore, Var_Array is approximated by a Poisson distribution of variables 0 to 255 (step 1404), and the processing is finished (step 1405). As a result of the processing described above, there is generated an arrangement of a variance of noise corresponding to a pixel value of an input image represented by inputted image data.

Incidentally, although according to the example described above, the explanation has been given of the example of calculating the variance Image_Var by aiming at the pixel in which the value of ActiveMap is a maximum value of three, there may be carried out processing of calculating the variance Image_Var by aiming at a pixel in which the value of ActiveMap is two. That is, there may be carried out processing by using a pixel in which at least aligning is carried out.

<Configuration of Image Interpolating Unit (Noise Reducing Unit)>

Figure 15:
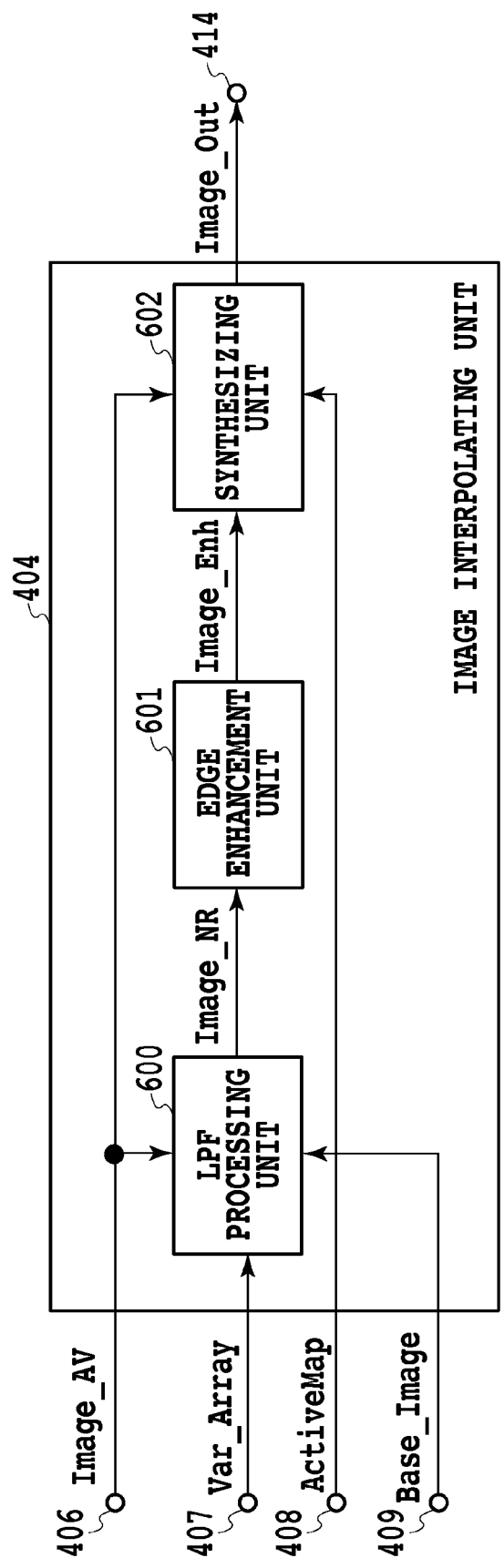
FIG. 15 is a diagram showing a configuration of an image interpolating unit 404 according to the first embodiment.

Next, an explanation will be given of a configuration of the image interpolating unit 404 with reference to FIG. 15. The image interpolating unit 404 includes an LPF processing unit 600 which outputs a noise-reduced image Image_NR by subjecting the base image data Base_Image to noise reduction by using the noise variance Var_Array corresponding to the brightness and the average image data Image_AV. Also, the image interpolating unit 404 includes an edge enhancement unit 601 which outputs image data Image_Enh representing an edge enhancement image by subjecting image data representing Image_NR to edge enhancement processing, and a synthesizing unit 602 which blends signals of the edge enhancement image data Image_Enh and Image_AV.

<Flow of Processing of Image Interpolating Unit>

Figure 16:
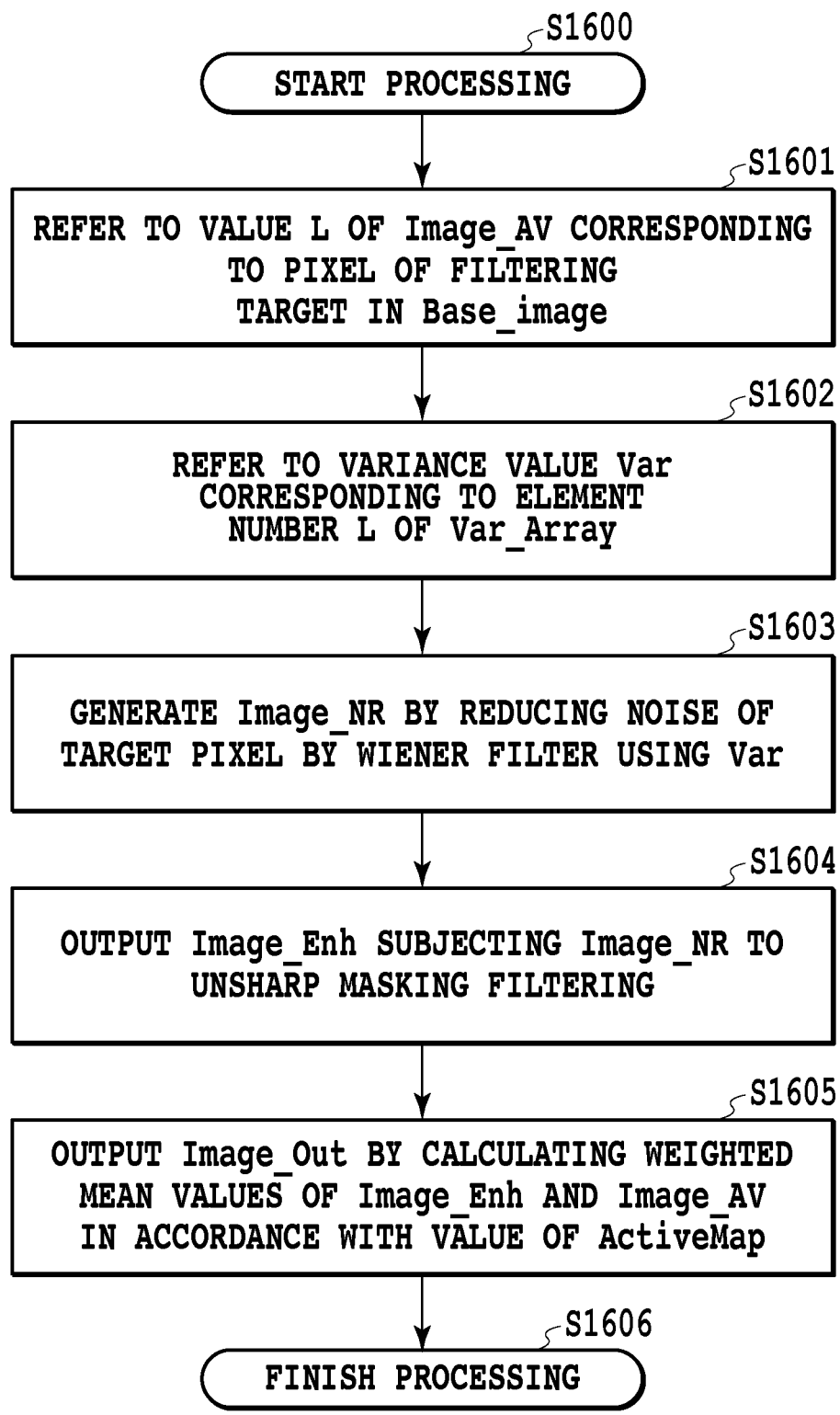
FIG. 16 is a diagram showing a flowchart of the image interpolating unit 404 according to the first embodiment.

An explanation will be given of a flow of processing of the image interpolating unit 404 by using FIG. 16. When processing is started (S1600), the LPF processing unit 600 refers to a value L of average image data Image_AV spatially corresponding to a pixel of a filtering object in the base image data Base_Image (S1601). Next, the LPF processing unit 600 refers to a variance value Var corresponding to an element number L of a noise variance Var_Array corresponding to a brightness (step 1602). Further, the LPF processing unit 600 reduces noise of a target pixel by a Wiener filter which uses Var, and generates a noise-reduced image Image_NR (step 1603). Thereafter, the edge enhancement unit 601 subjects image data represented by the noise-reduced image Image_NR to unsharp masking, and outputs edge enhancement image data Image_Enh (step 1604).

Finally, in a case in which a value of ActiveMap is one, the synthesizing unit 602 multiplies a pixel value of the spatially corresponding edge enhancement image Image_Enh by 0.75, multiplies a pixel value of Image_AV by 0.25, adds the multiplied values, and outputs the added value as a noise-reduced image Image_Out. In a case in which the value of the superposed-sheet number map ActiveMap is two, the synthesizing unit 602 multiplies the pixel value of the edge enhancement image Image_Enh by 0.5, multiplies the pixel value of Image_AV by 0.5, adds the multiplied values, and outputs the added value as the noise-reduced image Image_Out. In a case in which the value of ActiveMap is three, the synthesizing unit 602 multiplies the pixel value of the edge enhancement image Image_Enh by 0.25, multiplies the pixel value of Image_AV by 0.75, adds the multiplied values, and outputs the added value as the noise-reduced image Image_Out (step 1605). Further, the synthesizing unit 602 finishes the processing (step 1606). There can be provided an image in which a noise reducing degree is more uniform by synthesizing the image data in which the noise-reduced image Image_NR is subjected to unsharp masking, and Image_AV by changing weighting in accordance with the superposed-sheet number map ActiveMap.

The noise in the image can uniformly be reduced by subjecting a group of the input image data to the processing described above.

Incidentally, although at the noise variance measuring unit 505, the variance of the noise corresponding to the brightness is calculated, only one variance may be calculated for a total of the image data, and the LPF processing unit 600 may be operated by using the single variance. In this case, noise can be reduced at high speed.

In addition, although according to the present embodiment, there is shown an example of a camera array which includes plural image-capturing units, even when there are used a group of images which are a result of carrying out time difference image-capturing by a single lens camera, a similar effect is achieved. Also, the present embodiment can also be applied in a system of arranging a lens array between a sensor and a main lens other than a system of using plural lenses and sensors.

Furthermore, the processing may be finished at step 1603, and the noise-reduced image Image_NR may be outputted as the Image_Out after the noise is reduced, that is, an output image. Also in this case, the noise can be reduced at high speed.

(Other Embodiment)

In the example of the embodiment described above, the explanation has been given by taking the example of the image-capturing device which includes the plural image-capturing units. However, for example, images or the like which are obtained from plural image-capturing units may be transferred to an information processing apparatus or the like, and the noise reducing processing described above may be carried out at the information processing apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-200493, filed Sep. 14, 2011, which is hereby incorporated by reference herein in its entirety.

What is claimed is:

1. An image processing apparatus comprising:
an inputting unit constructed to input a plurality of pieces of image data obtained by capturing a same object from a plurality of different viewpoints;
an aligning unit constructed to perform aligning processing of a plurality of images represented by the plurality of pieces of image data;
an average image generating unit constructed to generate average image data representing an average image formed by pixels whose pixel values are obtained by averaging pixel values of pixels which are included in the plurality of images and aligned successfully by the aligning unit;
a noise obtaining unit constructed to obtain noise data which represents noise of at least one of the plurality of images by using pixel values of successfully aligned pixels of an image included in the images used for generating the average image and pixels values of pixels in the average image; and
a noise reducing unit constructed to reduce a noise of at least one of the plurality of images by using the noise data.

2. The image processing apparatus according to claim 1, further comprising:
a subtracting unit constructed to calculate a difference between pixel values of the average image and pixel values of the pixels which are included in the plurality of images and aligned successfully by the aligning unit;
wherein the noise data represents a variance of the noise and the noise obtaining unit obtains the noise data by using the difference.

3. The image processing apparatus according to claim 2, wherein the noise obtaining unit obtains as the noise data, a variance of the noise defined for each brightness.

4. The image processing apparatus according to claim 2, wherein the noise obtaining unit uses a single value in correspondence with a base image as the variance of the noise.

5. The image processing apparatus according to claim 1, further comprising:
a subtracting unit constructed to calculate a difference between pixel values of the average image and pixel values of the pixels which are included in the plurality of images and aligned successfully by the aligning unit; and a base image selecting unit constructed to select a base image from the plurality of images;
wherein the aligning unit performs aligning between the selected base image and a remaining image in the plurality of images;
wherein the subtracting unit calculates a difference between the average image and the base image; and
wherein the noise obtaining unit obtains the noise data by using the difference.

6. The image processing apparatus according to claim 1, wherein the aligning unit generates a correlation map describing a correlation value of each pixel provided by the aligning processing;
wherein the image processing apparatus further comprises a map generating unit constructed to generate a superposed-sheet number map indicating a number of sheets of images obtained by aligning the respective pixels based on the correlation map;
wherein the average image generating unit generates the average image data by using the superposed-sheet number map; and
wherein the noise reducing unit reduces the noise by using the superposed-sheet number map.

7. The image processing apparatus according to claim 6, wherein the noise reducing unit includes:
an edge enhancement unit constructed to generate edge enhancement image data representing an edge enhancement image obtained by performing edge enhancement on the noise-reduced image; and
a synthesizing unit constructed to generate an output image from the average image data, the edge enhancement image data, and the superposed-sheet number map.

8. The imaging apparatus according to claim 1, further comprising:
a map generating unit constructed to generate an active map which represents areas in the plurality of images where pixels are aligned successfully by the aligning unit,
wherein the noise obtaining unit obtains the noise data by using pixel values of the pixels in an area in at least one of the plurality of images represented by the active map and the pixel values of the average image.

9. The imaging apparatus according to claim 8, wherein the active map represents, for each pixel in the area, a number of corresponding images in the plurality of the images.

10. The imaging apparatus according to claim 9, wherein the average image generating unit calculates pixel values of the average image by summing up pixel values of the pixels in the area in at least one of the plurality of images represented by the active map and dividing the summed result by the number of images represented by the active map.

11. The imaging apparatus according to claim 1, wherein the plurality of images include pixels which are not successfully aligned by the aligning unit and the noise reducing unit reduces a noise of the pixels not successfully aligned by using the noise data.

12. An image processing method comprising the steps of:
inputting a plurality of pieces of image data obtained by capturing a same object from a plurality of different viewpoints;
performing aligning processing of a plurality of images represented by the plurality of pieces of image data;
generating average image data representing an average image formed by pixels whose pixel values are obtained by averaging pixel values of pixels which are included in the plurality of images and aligned successfully by the aligning step;

obtaining noise data which represents noise of at least one of the plurality of images by using pixel values of successfully aligned pixels of an image included in the images used for generating the average image and pixels values of pixels in the average image; and reducing a noise of at least one of the plurality of images by using the noise data.

13. A program on a non-transitory computer-readable storage medium, the program causing a computer to execute the image processing method according to claim 12.

* * * * *